R. I. FROST.
BEARING LUBRICATOR.
APPLICATION FILED DEC. 6, 1920.

1,425,000.

Patented Aug. 8, 1922.

Witness:
R. E. Hamilton

Inventor
Ralph I. Frost,
By Warren D. House
His Attorney.

UNITED STATES PATENT OFFICE.

RALPH I. FROST, OF AUGUSTA, KANSAS, ASSIGNOR TO THE GEO. W. BROWN & SON STATE BANK, TRUSTEE, OF AUGUSTA, KANSAS.

BEARING LUBRICATOR.

1,425,000.　　　　Specification of Letters Patent.　　Patented Aug. 8, 1922.

Application filed December 6, 1920. Serial No. 428,703.

*To all whom it may concern:*

Be it known that I, RALPH I. FROST, a citizen of the United States, residing at Augusta, in the county of Butler and State of Kansas, have invented a certain new and useful Improvement in Bearing Lubricators, of which the following is a specification.

My invention relates to improvements in bearing lubricators. It is particularly well adapted for use in connection with ball bearings.

The object of my invention is to provide a novel lubricating device for lubricating shaft bearings, which is simple in construction, cheap to make and effective in operation.

The novel features of my invention are hereinafter fully described and claimed.

In the accompanying drawing which illustrates the preferred embodiment of my invention, Fig. 1 is a vertical sectional view of my improved lubricator.

Similar reference characters designate similar parts in the different views.

Figure 1:
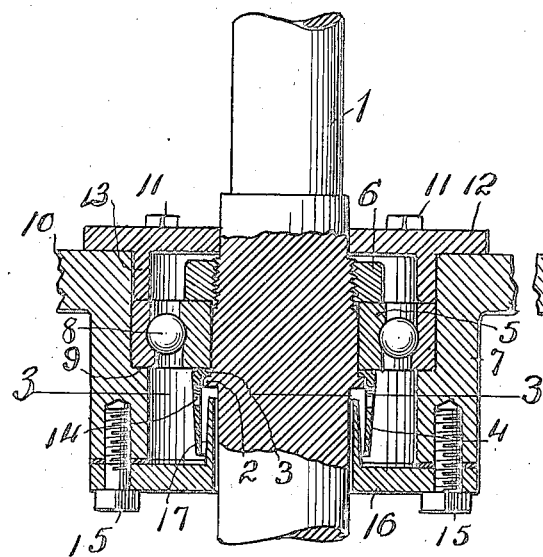

1 designates a vertical rotary shaft provided with an annular peripheral flange 2 upon which rests an inner annular flange 3 of an upwardly flaring member 4, the outer surface of which flares upwardly.

The shaft 1 is provided with bearing means comprising preferably the following described parts. 5 designates an inner annular bearing member which encircles and is fitted to the shaft 1 and which has its lower side clamped to the upper end of the flaring member 4 by a nut 6 mounted on a threaded part of the shaft 1. Encircling and spaced apart from the bearing member 5 is an outer bearing member 7 having an inner annular groove in which are mounted balls 8 which also are mounted in an annular peripheral groove in the member 5. The member 7 is mounted upon an annular shoulder 9 in a support 10 to which is secured by screws 11 a cap 12 having a downwardly extending annular flange 13 which holds the member 7 from upward movement and which has a central hole through which the shaft 1 extends.

When the shaft 1 revolves, the member 5 and the flaring member 4 will also be revolved, and oil or other suitable lubricant on the flaring surface will be automatically fed upwardly to and discharged upon the bearing means, comprising the members 5 and 7 and balls 8. The member 4 may be provided with one or more transverse holes 14 for carrying the lubricant from the inner wall thereof to the flaring surface.

For supplying the flaring surface continually with a lubricant, the lower smaller end of the flaring member 4 may be extended into a lubricant container located below the bearing means, and comprising, preferably, the following described parts.

Attached by bolts 15 to the under side of the support 10 is a plate 16 having a central tubular portion 17 which encircles the shaft 1 and which extends upwardly into the member 4.

By removing the cap 12, a lubricant, such as oil, may be poured onto the bearing means. The oil will pass between the balls 8 downwardly onto the plate 16, a sufficient quantity being supplied to immerse the lower end of the member 4. When the shaft 1 is rotated, the oil in the lubricant container will be carried therefrom by the flaring surface of the member 4, from which the oil will be discharged upwardly onto the members 5 and 7 and balls 8.

Figure 5:
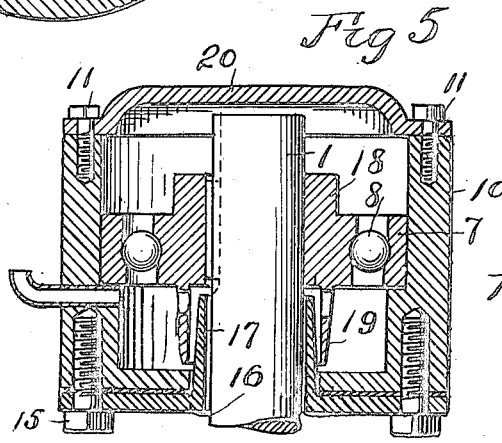
Fig. 5 is a vertical sectional view of a modified form of my invention.

In the form shown in Fig. 5, the inner bearing member 18 is keyed to the shaft 1, and the annular member 19, corresponding to the flaring member, 4, is similar to the latter, but is integral with the member 18. The cap 20 which is mounted on the support 10 is shown as covering the upper end of the shaft 1. In other respects the construction is similar to that already described and the mode of operation is the same.

Figure 2:
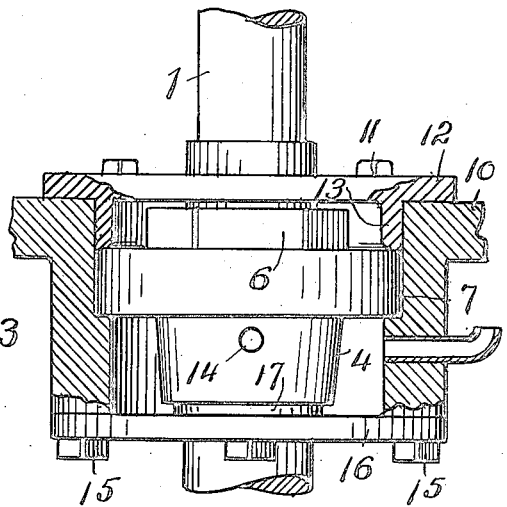
Fig. 2 is a view of the same partly in vertical section and partly in side elevation.
Figure 3:
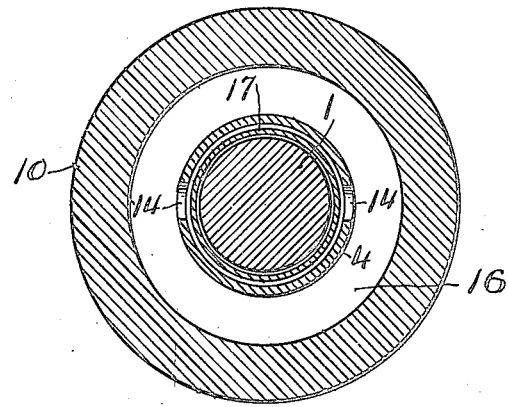
Fig. 3 is a horizontal section on the line 3—3 of Fig. 1.
Figure 4:
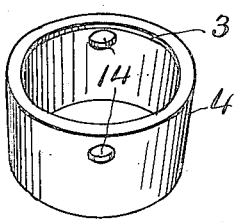
Fig. 4 is a perspective view of the annular flaring lubricant conducting member.

For supplying oil to the bearing, the member 10 may have mounted in its side wall below the member 7 a filling tube 21, Figs. 2 and 5.

I do not limit my invention to the structures shown and described, as other modifications, within the scope of the appended claims, may be made without departing from the spirit of my invention.

What I claim is:—

1. In a bearing lubricator, a rotary shaft having an annular peripheral flange, an annular member encircling the shaft and having an inner peripheral flange bearing against said first named flange, the annular member having one or more transverse holes, bearing means for the shaft arranged to hold said flanges together, and a lubricant container into which the annular member extends, substantially as set forth.

2. In a bearing lubricator, a vertical rotary shaft having an annular peripheral flange, an annular member encircling said shaft and having an inner peripheral flange bearing against said first named flange, the annular member having a flaring wall provided with one or more transverse holes, bearing means for the shaft arranged to hold said flanges together, and a lubricant container into which the annular member extends, substantially as set forth.

3. In a bearing lubricator, a vertical rotary shaft having an annular peripheral flange and screw-threaded above said flange, an annular member encircling said shaft having an inner peripheral flange bearing against said first named flange and having one or more transverse holes, a nut on said threaded shaft, bearing means on said shaft held by said nut against said annular member, and a lubricant container into which said annualr member extends, substantially as set forth.

4. In a bearing lubricator, a vertical rotary threaded shaft having an annular peripheral flange, a bearing member mounted on said shaft, an annular member encircling said shaft and spaced apart therefrom and having an inner peripheral flange bearing against said first named flange and provided with a flaring annular wall having one or more transverse holes, a nut on said threaded shaft arranged to hold the bearing member against said annular member, and a lubricant container into which said flaring wall extends, substantailly as set forth.

In testimony whereof I have signed my name to this specification.

RALPH I. FROST.